(12) United States Patent
Lea (10) Patent No.: US 6,977,737 B2
(45) Date of Patent: Dec. 20, 2005

(54) SYSTEM AND METHOD FOR CONTROLLING PRINTING PERFORMANCE

(75) Inventor: Perry Lea, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 965 days.

(21) Appl. No.: 09/925,402

(22) Filed: Aug. 9, 2001

(65) Prior Publication Data

US 2003/0030832 A1 Feb. 13, 2003

(51) Int. Cl.⁷ .......................................... G06K 15/00
(52) U.S. Cl. ........................... 358/1.13; 358/1.1
(58) Field of Search .................. 358/523, 522, 358/521, 520, 519, 518, 3.21, 3.24, 1.18, 358/1.14, 1.13, 1.6, 1.1

(56) References Cited

U.S. PATENT DOCUMENTS

2002/0085056 A1 * 7/2002 Ylitalo ........................ 347/19

* cited by examiner

Primary Examiner—Arthur G. Evans (57) ABSTRACT

The present disclosure relates to a system and method for controlling printing performance. In one arrangement, the system and method concern receiving identification of a desired printing performance, automatically determining which of several different printing parameters of the printing device to adjust to provide the desired printing performance, and adjusting the printing parameters of the printing device as necessary to provide the desired printing performance.

30 Claims, 7 Drawing Sheets

| VALUE | FONT SUBSTIT? | FONT BITMAPPING? | DOWN-SAMPLING? | COMPRES-SION | I/O BUFFER SIZE | MASERING BUFFER SIZE | JAM RECOVERY? |
|---|---|---|---|---|---|---|---|
| 1 | NO | YES | NO | Q = 15 8 MB | 1/10 of memory | 3/10 of memory | YES |
| 2 | NO | YES | NO | Q = 15 7 MB | 1/10 of memory | 3/10 of memory | YES |
| 3 | NO | YES | NO | Q = 20 7 MB | 1/10 of memory | 3/10 of memory | YES |
| 4 | NO | YES | NO | Q = 20 6 MB | 1/10 of memory | 2/10 of memory | YES |
| 5 | NO | NO | NO | Q = 20 6 MB | 2/10 of memory | 2/10 of memory | YES |
| 6 | NO | NO | YES | Q = 25 5 MB | 2/10 of memory | 2/10 of memory | YES |
| 7 | NO | NO | YES | Q = 30 5 MB | 2/10 of memory | 2/10 of memory | YES |
| 8 | NO | NO | YES | Q = 30 4 MB | 3/10 of memory | 1/10 of memory | YES |
| 9 | YES | NO | YES | Q = 30 4 MB | 3/10 of memory | 1/10 of memory | YES |
| 10 | YES | NO | YES | Q = 40 4 MB | 3/10 of memory | 1/10 of memory | NO |

SYSTEM AND METHOD FOR CONTROLLING PRINTING PERFORMANCE

FIELD OF THE INVENTION

The present disclosure relates to a system and method for controlling printing performance. More particularly, the disclosure relates to a system and method with which various low-level printing parameters can be controlled with a relatively simple user interface.

BACKGROUND OF THE INVENTION

Various different parameters affect printing performance. For instance, in regard to printing text, whether font substitution and font bitmapping are used can affect the speed with which the print job is completed and the quality of the printout. With respect to printing of images, other factors, such as whether resolution down-sampling is used and whether data compression is used during the printing process, can affect speed and print quality.

Generally speaking, print speed and print quality are inversely related. Specifically, when the printing parameters are set so as to provide high speed printing, the print quality may not be high. Similarly, if the printing device is configured for high quality printouts, it may take longer for the printouts to be created. Therefore, printing device design typically involves balancing print speed with print quality. In fact, printing devices are typically tuned by the manufacturer for a particular anticipated type of use. This tuning involves adjustment of the various printing parameters, such as those noted above, to achieve the desired printing performance for the anticipated use. For example, for machines that are marketed to persons that primarily print documents for personal (as opposed to commercial) use, the printing device may be tuned toward the high speed end of the speed/quality spectrum. If, on the other hand, the machine is to be marketed to persons that wish to print commercial documents (e.g., sales brochures), the printing device may be tuned toward the high quality end of the speed/quality spectrum.

Although tuning in this manner is appropriate for persons who intend to use their printing devices for single, specific applications, many persons may wish to use their printing devices for various different types of applications, some calling for high speed printing, others calling for high quality printing. For example, if a person wishes to print out a long document in draft form, that person may care less about quality than about print speed. The same person, however, may care more about print quality than speed, when printing a copy of a digital image of his or her family. Unfortunately, most printing devices are not adjustable in this manner. This normally is due to the fact that the firmware of conventional printing devices is static, i.e., not adapted for adjustment. Although the driver software sold along with the printing devices may allow the user to select between print speed and print quality, these selections typically do not change the internal settings of the printing device due to this static nature of the firmware. Accordingly, such selections normally do little to affect the print speed or quality.

Although a printing device could be constructed that provides for adjustment of the various low-level printing parameters, such as those noted above, such adjustability may not be desirable to many users. This is due to the fact that many users lack the imaging savvy to understand how the various parameters affect printing performance. Even where the user does understand this, the user may not wish to be bothered with having to individually adjust each of the print parameters due to the tedium involved with such an endeavor. This is particularly true where the user needs to adjust the parameters on a frequent basis, for instance where the user alternately prints high speed and high quality printouts. Furthermore, literally hundreds of different parameter setting combinations are possible. Therefore, the user may need to experiment extensively with the parameters until arriving upon a setting combination that is suitable for a particular print job.

From the foregoing, it can be appreciated that it would be desirable to have a system and method for controlling printing performance. Furthermore, it can be appreciated that it would be desirable to have such a system and method with which this performance can be adjusted with a relatively simple user interface to simplify the adjustment process.

SUMMARY OF THE INVENTION

The present disclosure generally relates to a system and method for controlling printing performance.

In one arrangement, the system comprises means for receiving identification of a desired printing performance, means for automatically determining which of several different printing parameters of the printing device to adjust to provide the desired printing performance, and means for adjusting the printing parameters of the printing device as necessary to provide the desired printing performance.

In one arrangement, the method comprises the steps of receiving identification of a desired printing performance, automatically determining which of several different printing parameters of the printing device to adjust to provide the desired printing performance, and adjusting the printing parameters of the printing device as necessary to provide the desired printing performance.

The present disclosure further relates to a printing device that is configurable so as to adjust the printing parameters of the printing device. In one arrangement, the printing device comprises a processing device, electrophotographic imaging components with which hardcopies can be created, and a print control module configured to adjust printing parameters in response to a received identification of a desired printing performance.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

As noted above, there is a need for a system and method for controlling printing performance. In view of this need, a novel system and method for controlling printing performance are disclosed herein. According to this novel system and method, various different printing parameters, which normally are static in conventional printing devices, may be adjusted by the user so that the user can personally tune the printing device as he or she sees fit. Therefore, the user can tune the printing device toward the high quality end of the performance spectrum or toward the high speed end of the spectrum as the case requires. As is further noted above, there is a need for a system and method with which the various printing parameters can be easily set by the user without requiring the user to individually adjust the parameters each time the printing device is tuned. Therefore, the novel system and method disclosed herein are adapted to automatically adjust the printing parameters for the user in response to user input received through a relatively simple user interface. As will be discussed below, in one embodiment the user interface comprises a graphical user interface (GUI) that presents a performance spectrum having high quality at one end of the spectrum and high speed at the other to the user. With this GUI, the user can specify where along the performance spectrum the user wishes the printing device to perform such that the printing parameters can be adjusted accordingly. As used herein, the term GUI is used to identify both the visual display presented to the user as well as the underlying programming and/or logic that is generates the display. Accordingly, the term GUI is not intended to be limited to the display alone but to also separately encompass the underlying software.

The general concept of the invention having been described, an example system for controlling printing parameters will be described with reference to the figures. Although this system is described in detail, it will be appreciated that this system is provided for purposes of illustration only and that various modifications are feasible without departing from the inventive concept.

Figure 1:
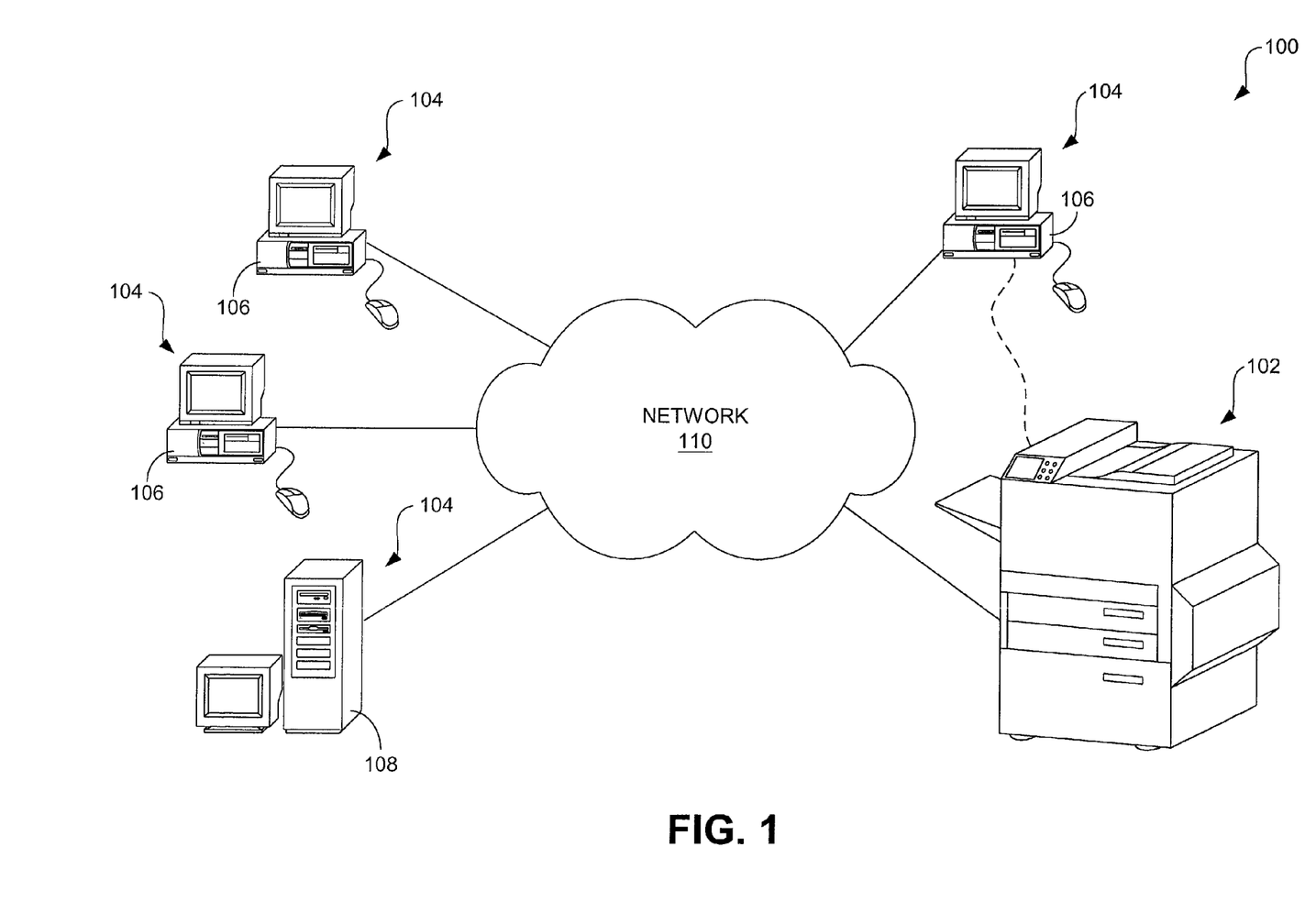
FIG. 1 is a schematic view of a system for controlling printing performance.

Referring now in more detail to the drawings, in which like numerals indicate corresponding parts throughout the several views, FIG. 1 illustrates a system 100 for controlling printing performance. As indicated in this figure, the system 100 generally comprises a printing device 102 and one or more computing devices 104. The printing device 102 is generally capable of outputting hardcopy documents in response to print jobs received from other devices such as the computing devices 104. Therefore, the printing device 102 may comprise a printer, photocopier, scanner, multi-function peripheral (MFP) device, or the like. The computing devices 104 can comprise substantially any device that is capable of transmitting data to the printing device 102 for printing. By way of example, the computing devices 104 comprise various personal computers (PCs) 106 and one or more network servers 108. Although PCs 106 and a server 108 are identified in FIG. 1 and discussed herein, it will be appreciated that any one of the computing devices 104 could, alternatively, comprise another type of computing device such as a network appliance or a handheld computing device such as a personal digital assistant (PDA) or mobile telephone.

As is further identified in FIG. 1, the printing device 102 and the computing devices 104 can be connected to a network 110 that typically comprises one or more sub-networks that are communicatively coupled to each other. By way of example, these networks can include one or more local area networks (LANs) and/or wide area networks (WANs). Indeed, in some embodiments, the network 110 may comprise a set of networks that forms part of the Internet. As is depicted in dashed lines, one or more of the computing devices 104 (e.g., a PC 106) can additionally or alternatively be directly connected to the printing device 102. Such an arrangement is likely in a home environment in which the user does not have a home network and instead directly sends print jobs from a PC 106 to the printing device 102. In such a scenario, communication can be facilitated with electrical and/or optical communication lines or with wireless communications components.

Figure 2:
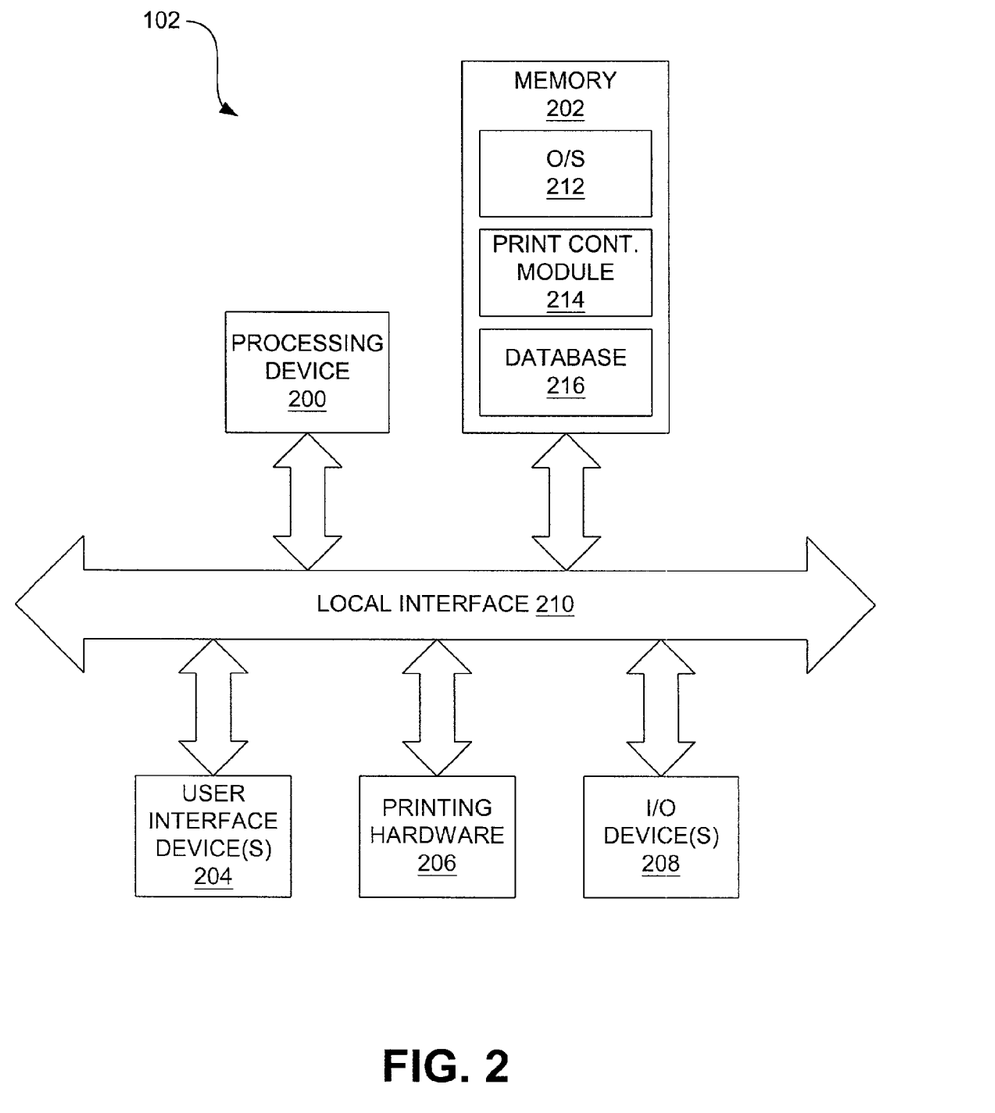
FIG. 2 is a schematic view of a printing device shown in FIG. 1.

FIG. 2 is a schematic view illustrating an example architecture for the printing device 102 shown in FIG. 1. As indicated in FIG. 2, the printing device 102 can comprise a processing device 200, memory 202, one or more user interface devices 204, printing hardware 206, and one or more input/output (I/O) devices 208. Each of these components is connected to a local interface 210 that, by way of example, comprises one or more internal buses. The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprising discrete elements both individually and in various combinations to coordinate the overall operation of the printing device 102.

The one or more user interface devices 204 typically comprise interface tools with which the device settings can be changed and through which the user can communicate commands to the printing device 102. By way of example, the user interface devices 204 comprise one or more function keys and/or buttons with which the operation of the printing device 102 can be controlled and a display, such as a liquid crystal display (LCD), with which information can be visually communicated to the user and, where the display comprises a touch-sensitive screen, commands can be entered.

The printing hardware 206 comprises the components with which the printing device 102 generates hardcopy printouts. By way of example, the printing hardware 206 comprises electrophotographic imaging components such as a charge roller, photoconductor drum, laser scanner, developing roller, fusing system, and print medium conveyance mechanism. The one or more I/O devices 208 are adapted to facilitate connection to the network 110 and/or to another device, such as a computing device 104, and may therefore include one or more serial and/or parallel ports.

The memory 202 includes various software (e.g., firmware) programs including an operating system 212 and a print control module 214. The operating system 212 contains the various commands used to control the general operation of the printing device 102. The print control module 214 comprises software (e.g., firmware) that controls the operation of the printing hardware 206 and, as discussed below in greater detail, the adjustment of various printing parameters that can affect printing performance. The operation of the print control module 214 is described with reference to FIGS. 4–6 below. In addition to these programs, the memory 202 can further include a database 216 that stores information such as various different preprogrammed performance settings.

Figure 3:
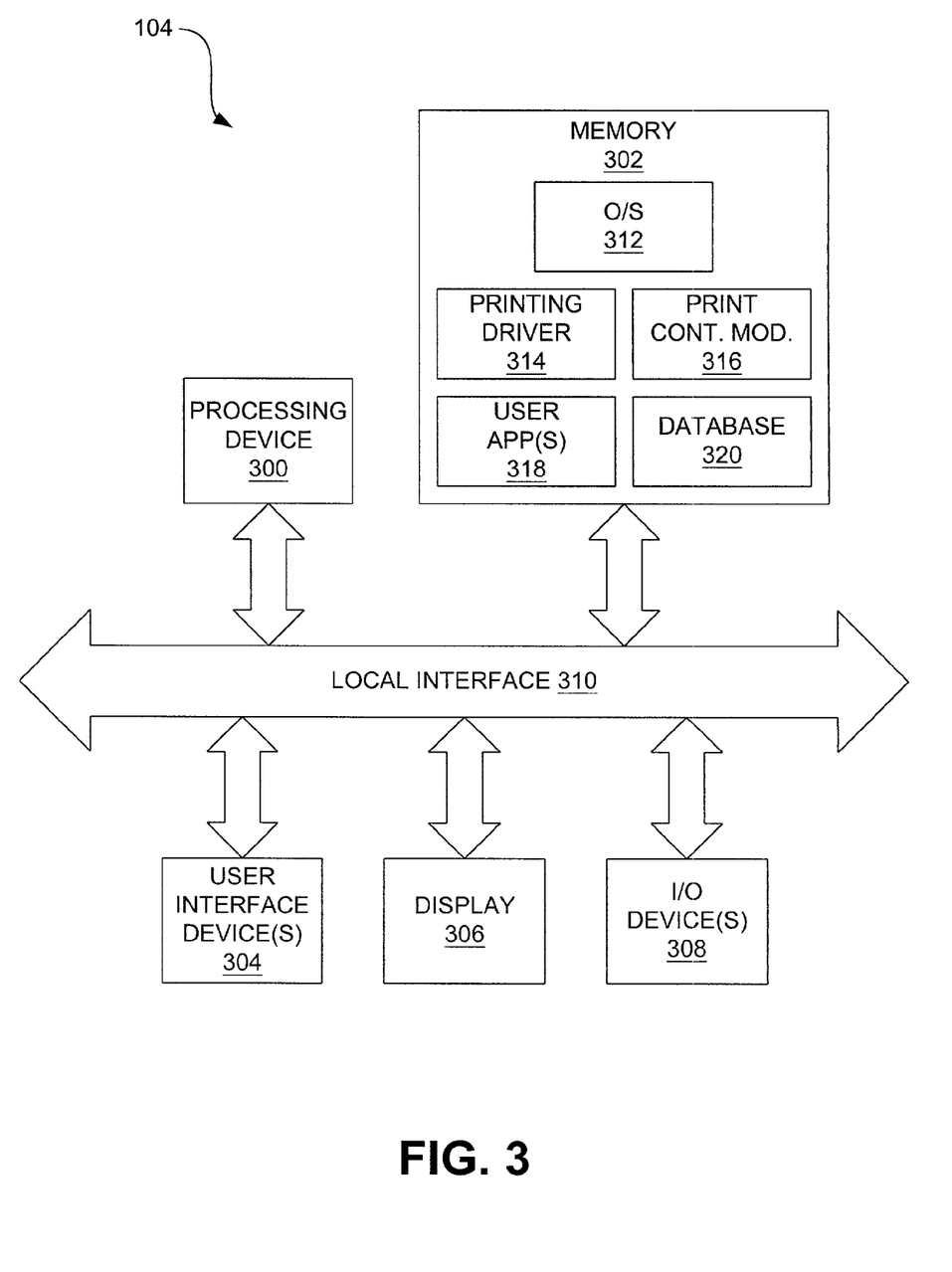
FIG. 3 is a schematic view of a computing device shown in FIG. 1.

FIG. 3 is a schematic view illustrating an example architecture for the computing devices 104 shown in FIG. 1. As indicated in FIG. 3, each computing device 104 can comprise a processing device 300, memory 302, one or more user interface devices 304, a display 306, and one or more I/O devices 308, each of which are connected to a local interface 310. The processing device 300 can include any custom made or commercially available processor, a central processing unit (CPU) or an auxiliary processor among several processors associated with the computing device 104, a semiconductor based microprocessor (in the form of a microchip), or a macroprocessor. The memory 302 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 304 comprise those components with which commands are communicated to the computing device 104. By way of example, these components can comprise those typically used in conjunction with a PC such as a keyboard and mouse. Similarly, the display 306 can comprise a display typically used in conjunction with a PC such as a computer monitor. The one or more I/O devices 308, like I/O devices 208, comprise components that facilitate connection to the network 110 and/or direct connection to another device, such as the printing device 102.

The memory 302 normally comprises an operating system 312, a printing driver 314, a print control module 316, and one or more user applications 318. The operating system 312 controls the execution of other software and provides scheduling, input-output control, file and data management, memory management, and communication control and related services. The printing driver 314 is adapted to facilitate communications with the printing device 102 and, more particularly, to transmit print jobs to the printing device. The print control module 316 comprises software, for example, a driver, that is used to control the printing performance of the printing device 102 remotely. With such software, each user can control the printing parameters of the printing device 102 as desired on a job-by-job basis or, where operation of the printing device is controlled by a network administrator, the administrator can control the printing parameters globally for all users. Operation of the print control module 316 is described in detail below with reference to FIGS. 5–7. The one or more user applications 318 can comprise, for instance, a word processing application and/or an image processing application. In addition to these programs, the memory 302 can comprise a database 320 that, like database 216, can be used to store various information such as different preprogrammed performance settings.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 4:
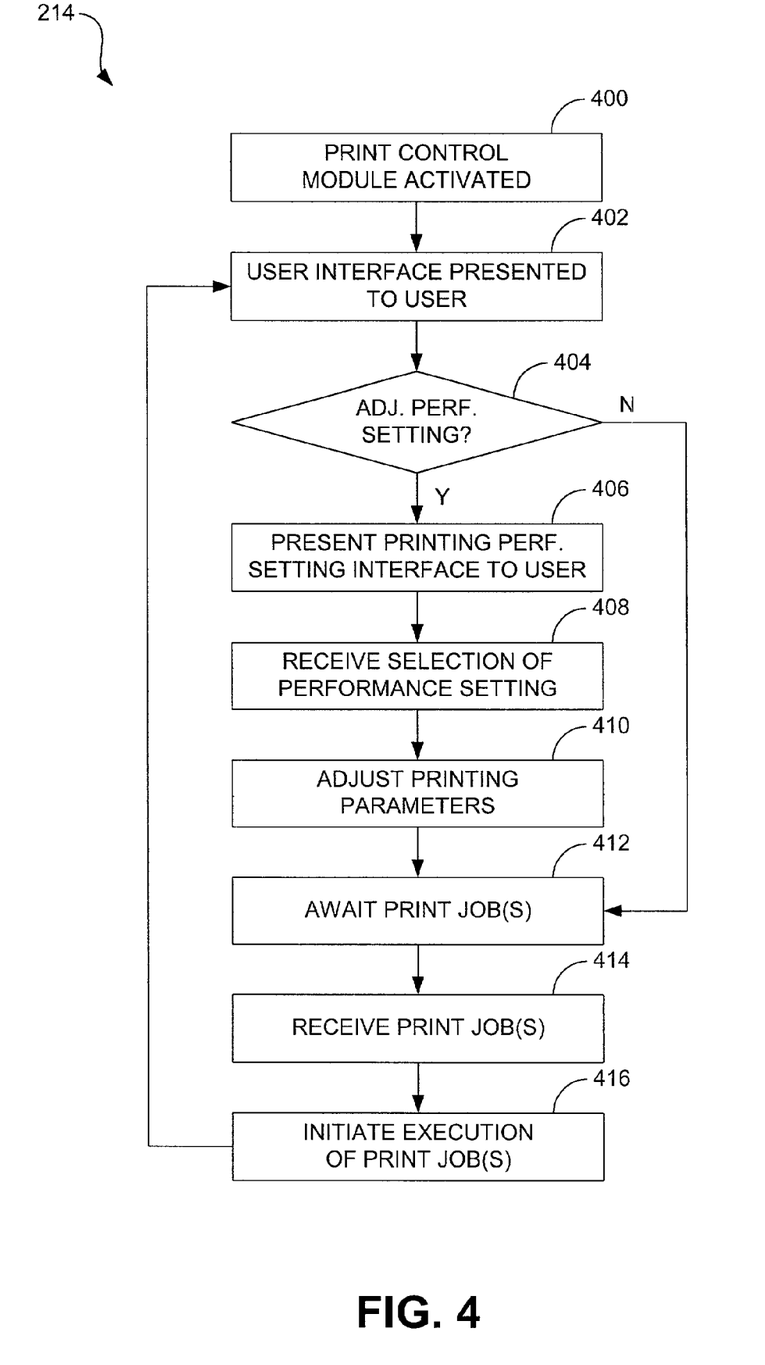
FIG. 4 is a flow diagram that illustrates an example of operation of a print control module of the printing device shown in FIG. 2.

With reference to FIG. 4, illustrated is an example of operation of the print control module 214 of the printing device 102. In this example, a control panel (not shown) of the printing device 102 can be used to control the printing performance of the printing device. Where provided, the control panel comprises various user interface devices such as those noted above in reference to FIG. 2. Accordingly, the control panel may comprise one or more function keys and/or buttons and a display, such as an LCD. Referring first to block 400 of FIG. 4, the print control module 214 can be activated with the control panel. By way of example, this activation may comprise the selection of one or more function keys or buttons of the printing device 102. Alternatively or in addition, activation can occur automatically when the printing device 102 detects motion indicating the presence of a person. In any case, once the print control module 214 is activated, a user interface is presented to the user, as indicated in block 402. Normally, the user interface comprises a GUI with which information can be easily communicated to the user.

Referring to decision element 404, it can then be determined whether the user would like to adjust the printing performance setting of the printing device 102. If not, a default performance setting, or a setting previously selected by a user, is to be left unchanged and flow can continue down to block 412 described below. If, on the other hand, the printing performance setting is to be adjusted (as determined by, for instance, receipt of a change setting request communicated by selection of a function key or button), flow continues to block 406 at which the print control module 214 presents a printing performance setting user interface to the user. Again, this user interface typically comprises a GUI with which information can easily be conveyed to the user. Although the setting user interface is described as being presented to the user only after it is determined that the user is interested in adjusting the setting, it will be understood by persons having ordinary skill in the art that such a setting user interface can form part of the default user interface presented to the user in block 402 immediately after activation of the print control module 214, if desired. Once the setting user interface is presented to the user, the selection of a printing performance setting can be received, as indicated in block 408.

Figure 5:
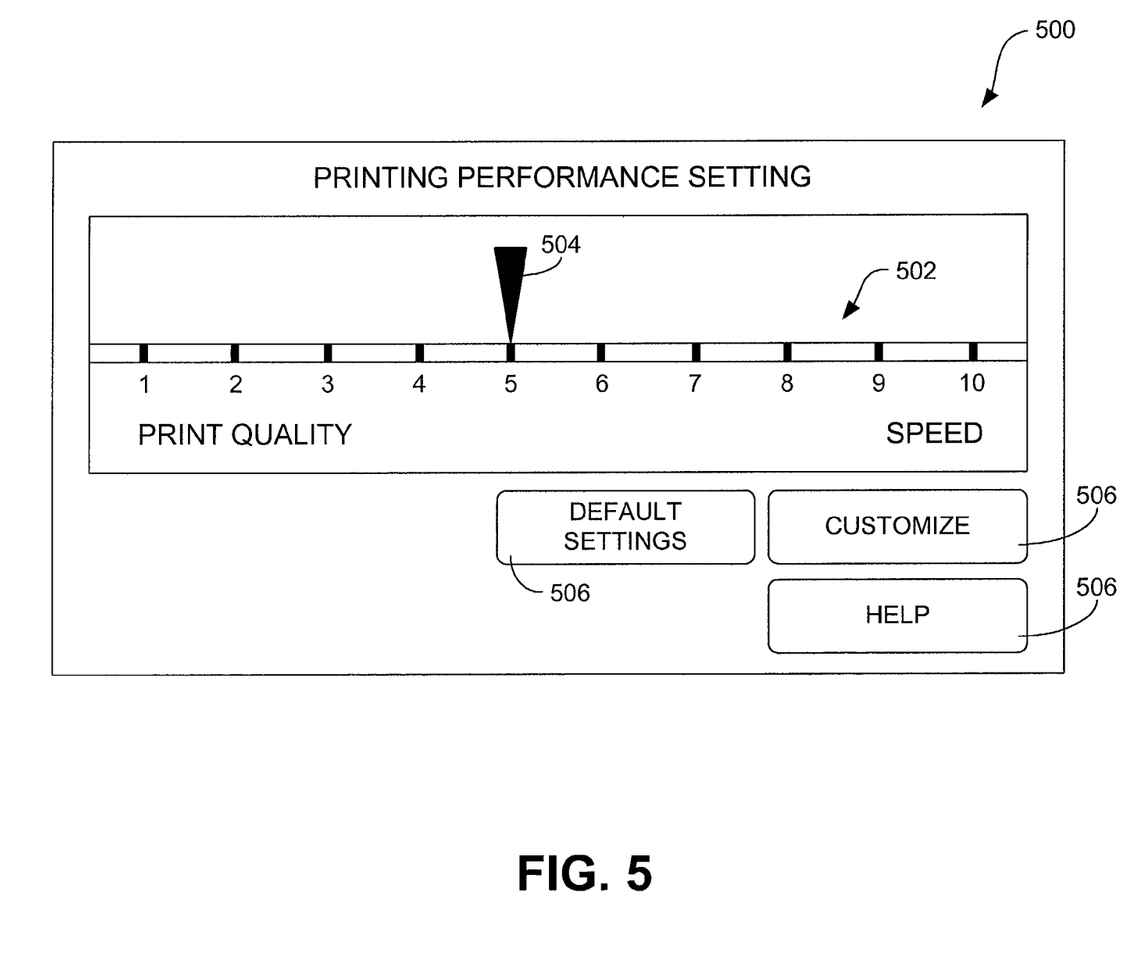
FIG. 5 is a schematic view of a graphical user interface that can be used to control printing performance.

Referring now to FIG. 5, illustrated is an example printing performance setting user interface 500 with which the print control module 214 can receive a selected printing performance setting. As illustrated in this figure, the user interface 500 can comprise a GUI that includes a setting bar 502 that represents a printing performance spectrum having high print quality at one end and high print speed at the other. With this setting bar 502, the user can indicate where along the spectrum he or she would like the printing device 102 to perform. This indication can be conveyed to the device 102 by moving an indicator 504 to a desired location along the setting bar 502. This can be accomplished in a variety of ways. For instance, where the display of the printing device comprises a standard LCD, movement of the indicator 504 along the setting bar 502 can be accomplished by manipulation of buttons (e.g., right and left arrow buttons) provided on the control panel of the printing device 102. Alternatively, where the display of the device 102 is touch-sensitive, the user can "manually" move the indicator 504 by dragging it to the desired location or by tapping the desired location for the indicator at some point along the setting bar 502.

With such a user interface 500, the user can easily choose to increase print quality by moving the indicator 504 closer to the print quality end of the setting bar 502, or increase print speed by moving the indicator closer to the speed end of the setting bar. The print control module 214 is configured to, in response to movement of the indicator 504, adjust the various low-level printing parameters of the printing device 102 to achieve the printing performance desired by the user. As noted above, many different printing parameters affect printing performance. Therefore, the print control module 214 typically is configured to associate a particular position of the indicator 504 along the setting bar 502 with particular configurations for each of the various printing parameters that are adjustable. These associations can be determined by the print control module 214 with reference to data stored within the database 216 (FIG. 2). To simplify the task of determining the appropriate parameter configurations, the setting bar 502 can be divided into a plurality of individual setting values. For instance, as identified in FIG. 5, the setting values can range from 1 to 10, where 1 indicates peak print quality and 10 indicates peak print speed. Although these values are indicated in the user interface 500 shown in FIG. 5, it is to be understood that these values could be hidden from the user, if desired. In addition, although values 1 through 10 have been identified, it will be understood that greater or fewer values could be provided, as desired. Moreover, it is to be noted that the setting bar 502 is just one example of various GUIs that could be used to convey a spectrum of printing performance. Other examples include a dial and a variety of buttons having increasing values.

Figure 6:
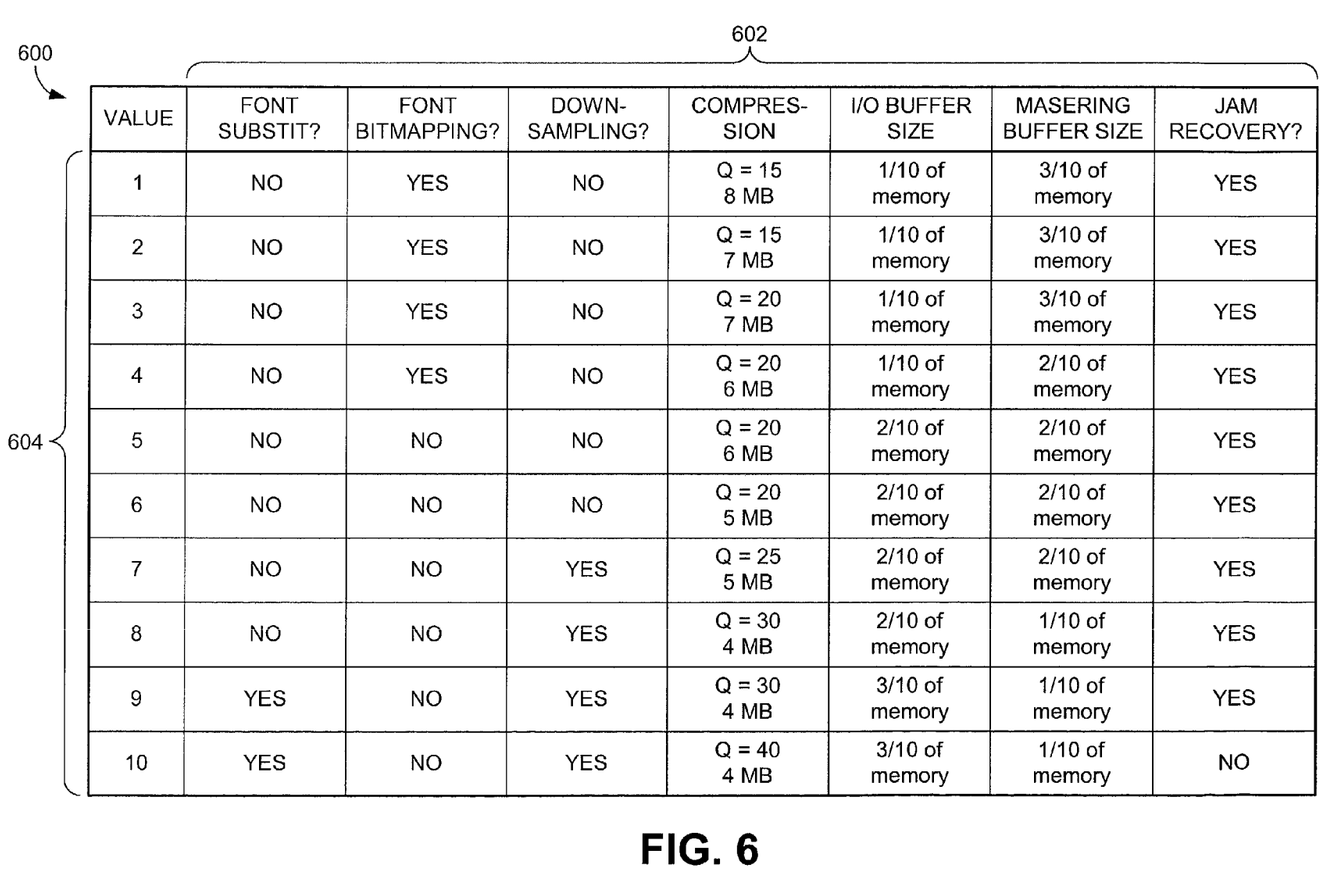
FIG. 6 is a schematic representation of example associations between performance settings and various printing parameters.

In some embodiments, the associations between the printing performance setting and the various printing parameters can be determined by the print control module 214 with reference to a look-up table stored in the database 216. An example look-up table 600 is provided in FIG. 6. As indicated in this figure, the table 600 crosses a variety of printing parameters 602 with a variety of setting values 604. By way of example, and as shown in FIG. 6, the printing parameters 602 can pertain to font substitution, font bitmapping, resolution down-sampling, data compression limits, I/O buffer sizes, masering buffer sizes, and jam recovery. Although these particular printing parameters are identified in FIG. 6, it will be understood that various other printing parameters may be adjusted by the print control module 214, if desired. Therefore, the printing parameters of FIG. 6 are provided as an example only to facilitate discussion of the operation of the print control module 214.

As known in the art, font substitution involves substituting of fonts described in a print job with fonts stored locally within the printing device 102. For instance, if a print job includes text written in Times Roman™ font, the printing device 102 may have its own version of Times Roman™ stored within device memory 202. In such a case, the printing device 102 can complete the print job by substituting its own version of the pertinent font instead of having to configure each character in accordance with detailed mathematical relationships that define each curve of each character supplied to the printing device in the print job transmission. When used in this manner, font substitution can greatly increase the speed with which print jobs are completed. Unfortunately, however, font substitution can result in slight variations of the fonts and therefore a lesser print quality. In view of this, font substitution is normally utilized when the user values print speed over print quality. Referring to the table 600 of FIG. 6, font substitution may therefore only be used by the print control module 214 when the setting value is high (e.g., equal or greater to "9").

As noted above, various mathematical relations can be provided that describe the configuration of each character according to a given font. Alternatively, characters can be rendered as a bitmap within the printing device early in the printing process. Generally speaking, higher print quality can be achieved when the characters are rendered in this manner. However, in that the rendering process requires a relatively long time to complete, rendering the characters as bitmaps can slow the printing process and therefore reduce the print speed of the printing device. Therefore, as indicated in FIG. 6, font bitmapping can be enabled by the print control module 214 where relatively high quality is desired (e.g., setting values 1–4) and disabled where relatively high speed is desired (e.g., setting values 5–10).

Images typically contain a large amount of data. Therefore, printing of images or documents containing images can slow the printing process. To increase the speed of the printing process, the resolution of the image or images can be down-sampled to remove data used to create the image. Any time down-sampling is used, however, the quality of the image is reduced. Therefore, as indicated in FIG. 6, down-sampling can be, for instance, used where the setting value is relatively high (e.g., equal to or greater than "7"). In addition, if it is determined that down-sampling is to be used, it can be determine to what extent an image is to be down-sampled. Therefore, different maximum resolutions can be specified for different setting values, if desired.

Data compression is also typically used for printing images to reduce the amount of data that must be manipulated within the printing device 102 during the printing process. In particular, data compression algorithms are used to reduce the size of image files used to print images. Typically, two different types of algorithms are used: lossless and lossy algorithms. Lossless algorithms are preferable from a print quality perspective because they can be used to shrink an image file in a manner in which no print quality will be lost. However, lossless algorithms do not compress data very well. Therefore, lossy algorithms, which discard a portion of data, may be used instead of lossless algorithms where the compressed file sizes would be too large.

The most common type of lossy compression is a form created by the Joint Photographic Experts Group commonly known as JPEG. JPEG compression can be used to control the amount of data that is lost by adjusting the "quantization" variable, commonly known as the "Q factor." Lower Q factors result in images with less perceptible loss. However, lower Q factors can slow the printing process in that less data is discarded and therefore more data must be manipulated by the device. In addition to adjustment of the Q factor, adjustment of compression limits can also be used to control printing performance. The compression limit pertains to the maximum size that an image file can have after being compressed by a lossless algorithm before resorting to a lossy (e.g., JPEG) algorithm. Therefore, larger compression limits will generally result in higher print quality. As indicated in FIG. 6, data compression can be automatically controlled in terms of both Q factor and compression limits with larger Q factors and compression limits being provided where high quality is desired and smaller Q factors and compression limits being provided where high speed is desired.

Another parameter that affects printing performance is the size of the I/O buffer. As is known in the art, the I/O buffer comprises a portion of the printing device memory in which transmitted print data is temporary stored within the printing device 102 as it is received. Relatively large I/O buffers permit more data to be transmitted to the printing device 102 at any given time, and therefore increase the print speed. However, where the size of the total memory is not large, a large I/O buffer can monopolize memory that could be used for the rendering process, resulting in a reduction in print quality. Accordingly, as indicated in FIG. 6, the size selected by the print control module 214 for the I/O buffer can increase along with the setting value such that a relatively small I/O buffer is provided for high quality printing and a relatively large I/O buffer is provided for high speed printing.

Masering is a technique in which print data for a particular print job (e.g., a particular page) is stored within the printing device 102 such that the same print job need not be interpreted, parsed, etc. each time a hardcopy is to be output. This technique is particularly useful where the user is printing multiple (e.g., twenty) copies of the same document. In such a situation, masering can greatly increase the speed at which print jobs are completed. Normally, where the printing device 102 is capable of masering, a portion of memory (RAM) is dedicated to a masering buffer used in the masering process. As with the I/O buffer, the size of the masering buffer can affect printing performance, enabling high speed, potentially lower quality printing when the buffer is relatively large and enabling high quality, potentially lower speed printing when the buffer is relatively small. Therefore, as indicated in FIG. 6, the print control module 214 can adjust the masering buffer to be relatively small when a lower setting value is selected, and relatively large when a higher setting value is selected.

Jam recovery pertains to the storage of print data pertinent to each sheet of paper by the printing device 102 prior to the output of the paper such that, if a paper jam occurs, damaged printed sheets can be reprinted by the printing device once the jam is cleared. For printing devices having relatively long paper paths, this means that data for nearly ten different sheets may be stored by the printing device 102 during a given print job. Although jam recovery automatically compensates for jams so that complete documents can be printed without having to reprint damaged sheets (thereby providing high "quality"), jam recovery delays the completion of a print job in that various printed sheets are reprinted. At times, jam recovery may be less important to the user than print speed. For instance, where the user is printing several copies of the same sheet, jam recovery may not be necessary and may unduly slow completion of the print job. Therefore, as indicated in FIG. 6, jam recovery may be disabled by the print control module 214 where the user has selected a high (e.g., the highest) setting value.

Although various associations have been described above between the setting values and the various printing parameters identified in FIG. 6, it is to be understood that these associations have been provided by way of example only and that other associations are feasible and may even be preferable.

Printing performance can be adjusted with the print control module 214 in other ways than with the setting bar 502 alone. Therefore, returning to FIG. 5, the user interface 500 can, optionally, further include various soft keys 506 pertinent to printing performance. These keys 506 can include, for instance, a "default settings" key with which the user can access preprogrammed (either by the manufacturer or by the user) printing performance settings. In addition, the keys 506 can include a "customize" key with which the user can, if desired, adjust the various adjustable printing parameters individually. Furthermore, the keys 506 can include a "help" key with which the user can obtain printing performance setting help.

Returning now to the flow diagram of FIG. 4, once the selected printing performance setting has been received, the print control module 214 adjusts the printing parameters accordingly, as indicated in block 410. For instance, with reference back to FIG. 6, where the user has selected a printing performance setting value of "2," indicating high quality printing is desired, no font substitution will be used, font bitmapping will be used, no resolution down-sampling will be used, etc. At this point, the print control module 214 can await a print job, as indicated in block 412, and once a print job is received (block 414), initiate the execution of the print job, as indicated in block 416. Next, flow returns to block 402 at which the user interface can again be presented to the user.

Figure 7:
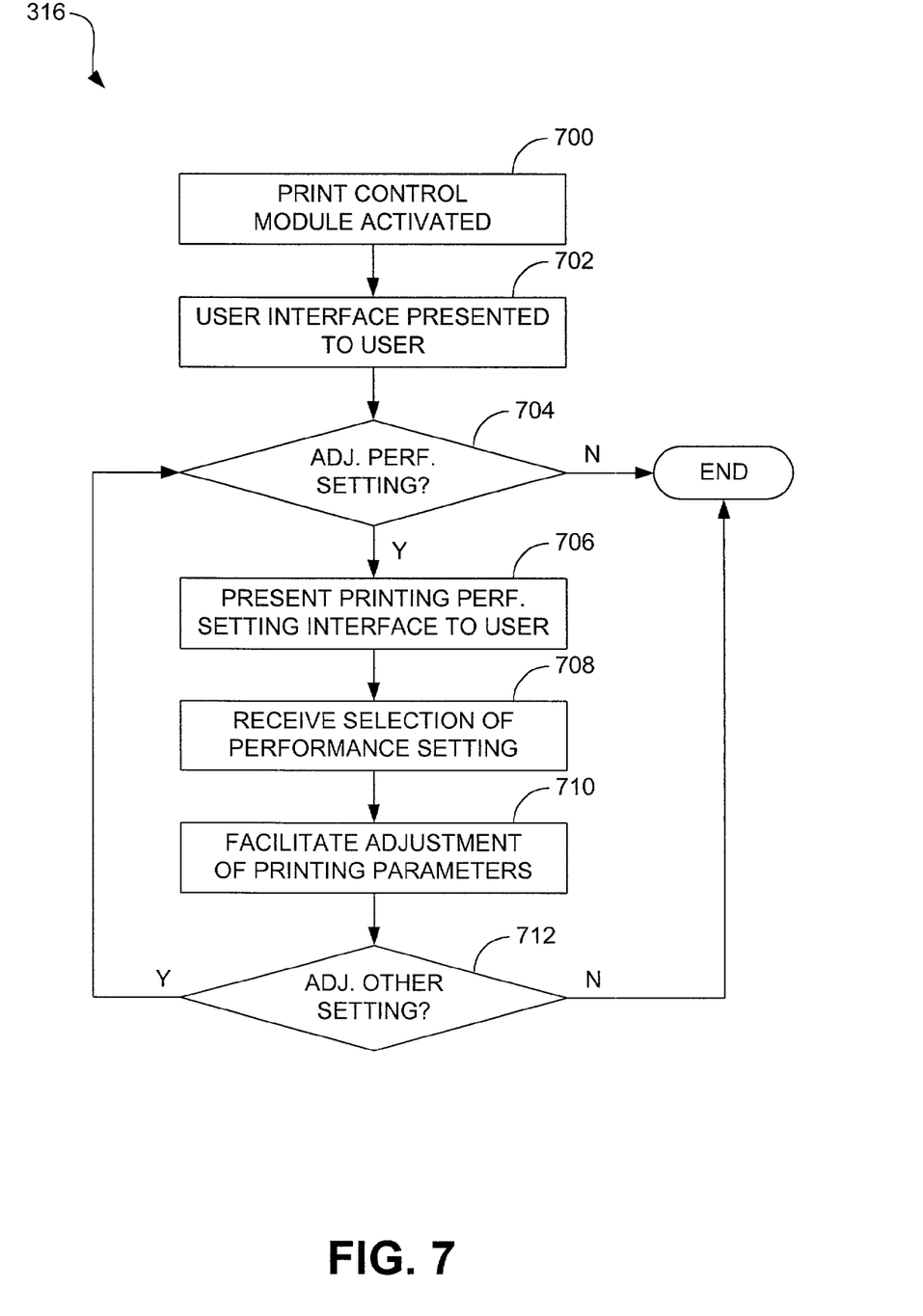
FIG. 7 is a flow diagram that illustrates an example of operation of a print control module of the computing device shown in FIG. 3.

The printing performance of the printing device 102 can also be adjusted remotely using another device, such as a computing device 104 (FIG. 1). FIG. 7 provides an example of operation of the print control module 316 as used to control the printing performance setting. Beginning with block 700, the print control module 316 of the computing device 104 can be activated. In this scenario, this activation can occur through the opening of an application stored on the computing device 104 such as a printing device control application. Once the print control module 316 is activated, a user interface is presented to the user, as indicated in block 702. As with the print control module 214, this user interface typically comprises a GUI that, in this case, is presented to the user with the display 306 of the computing device 104.

With reference now to decision element 704, it can then be determined whether the user would like to adjust the printing performance setting. If not, flow is terminated in terms of printing performance setting adjustment. If, on the other hand, the printing performance setting is to be adjusted, flow continues to block 706 at which the print control module 316 presents a printing performance setting user interface to the user. Once more, this user interface can have the general arrangement shown in the example of FIG. 5. As with the flow described in reference to FIG. 4, although the setting user interface is described as being presented to the user only after it is determined that the user is interested in adjusting the setting, it will be understood by persons having ordinary skill in the art that such a setting user interface can form part of the default user interface presented to the user in block 702.

At this point, the selection of a printing performance setting can be received, as indicated in block 708, in similar manner to that described above in reference to FIG. 4. Once the selected printing performance setting has been received, the print control module 316 facilitates adjustment of the printing parameters, as indicated in block 710. The nature of this facilitation depends upon the situation. For instance, where the computing device 104 is directly connected to printing device 102 in a non-network (e.g., home) environment, the pertinent printing parameters may be transmitted to the printing device as a new default setting. In a network environment where the computing device 104 is one of several hosts that use the printing device 102, facilitation may comprise adjusting the printing parameters for a particular print job or for all print jobs transmitted by a particular computing device. Alternatively, where the computing device 104 comprises a device operated by a network administrator (e.g., network server 108), facilitation can be adjustment of the printing parameters globally for all print jobs performed by the printing device 102.

Next, flow can continue on to decision element 712 at which it can be determined whether another setting adjustment is to occur. If so, flow returns to decision element 704 described above or is otherwise terminated. Operating in this manner, the print control module 316 can be used to ensure that the most suitable printing parameters are used for each print job sent to the printing device 102, all with great ease to the user.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for controlling printing performance of a printing device, comprising the steps of:
   receiving identification of a desired printing performance from a user;
   automatically determining which of several different printing parameters of the printing device to adjust to provide the desired printing performance; and
   adjusting the printing parameters of the printing device as necessary to provide the desired printing performance by changing internal settings of the printing device, the internal settings including those affecting quality and speed of the printing performance of the printing device.

2. The method of claim 1, wherein the step of receiving identification of a desired printing performance comprises receiving identification of a printing performance setting.

3. The method of claim 2, wherein the printing performance setting is received via a graphical user interface (GUI).

4. The method of claim 3, wherein the graphical user interface (GUI) includes an indication of a performance spectrum with high printing quality at one end of the spectrum and high print speed at another end of the spectrum.

5. The method of claim 4, wherein the spectrum comprises a plurality of different setting values that identify different printing performance configurations.

6. The method of claim 1, wherein the printing parameters pertain to at least one of font substitution and font bitmapping.

7. The method of claim 1, wherein the printing parameters pertain to at least one of resolution down-sampling, data compression, I/O buffer size, masering buffer size, and jam recovery.

8. The method of claim 1, wherein the step of receiving identification of a desired printing performance comprises receiving identification with the printing device directly.

9. The method of claim 1, wherein the step of receiving identification of a desired printing performance comprises receiving identification with a computing device separate from the printing device.

10. A system for controlling printing performance of a printing device, comprising:
    means for receiving identification of a desired printing performance from a user;
    means for automatically determining which of several different printing parameters of the printing device to adjust to provide the desired printing performance; and
    means for adjusting the printing parameters of the printing device as necessary to provide the desired printing performance by changing internal settings of the printing device, the internal settings including those affecting quality and speed of the printing performance of the printing device.

11. The system of claim 10, wherein the means for receiving identification of a desired printing performance comprises a graphical user interface (GUI).

12. The system of claim 11, wherein the graphical user interface (GUI) includes an indication of a performance spectrum with high printing quality at one end of the spectrum and high print speed at another end of the spectrum.

13. The system of claim 12, wherein the spectrum includes a plurality of different setting values that identify different printing performance configurations.

14. The system of claim 10, wherein the printing parameters pertain to at least one of font substitution and font bitmapping.

15. The system of claim 10, wherein the printing parameters pertain to at least one of resolution down-sampling, data compression, I/O buffer size, masering buffer size, and jam recovery.

16. A printing device, comprising:
    a processing device;
    electrophotographic imaging components with which hardcopies can be created; and
    a print control module configured to adjust printing parameters in response to a received identification of a desired printing performance from a user, wherein the printing parameters correspond to internal settings of the printing device, the internal settings including those affecting quality and speed of printing performance of the printing device.

17. The device of claim 16, further comprising a graphical user interface (GUI) with which the identification of the desired printing performance can be received, the graphical user interface (GUI) including an indication of a performance spectrum with high printing quality at one end of the spectrum and high print speed at another end of the spectrum.

18. The device of claim 17, wherein the spectrum includes a plurality of different setting values that identify different printing performance configurations.

19. The device of claim 16, wherein the print control module is configured to adjust at least one of font substitution and font bitmapping.

20. The device of claim 16, wherein the print control module is configured to adjust at least one of resolution down-sampling, data compression, I/O buffer size, masering buffer size, and jam recovery.

21. A printing device driver configured to control printing performance of a printing device, comprising:
   logic configured to receive identification of a desired printing performance from a user;
   logic configured to automatically determine which of several different printing parameters of the printing device to adjust to provide the desired printing performance; and
   logic configured to facilitate adjustment of the printing device printing parameters to provide the desired printing performance by changing internal settings of the printing device, the internal settings including those affecting quality and speed of the printing performance of the printing device.

22. The printing device driver of claim 21, where in the logic configured to facilitate adjustment of the printing parameters comprises logic configured to facilitate transmission of specific desired printing parameters to the printing device.

23. The printing device driver of claim 21, further comprising a graphical user interface (GUI) configured to receive an identification of a printing performance setting.

24. The printing device driver of claim 23, wherein the graphical user interface (GUI) includes a performance spectrum with high printing quality at one end of the spectrum and high print speed at another end of the spectrum.

25. The printing device driver of claim 21, wherein the printing parameters pertain to at least one of font substitution, font bitmapping, resolution down-sampling, data compression, I/O buffer size, masering buffer size, and jam recovery.

26. Software for controlling printing performance of a printing device, the software being stored on a computer readable medium, comprising:
   logic configured to receive identification of a desired printing performance from a user;
   logic configured to automatically determine which of several different printing parameters of the printing device to adjust to provide the desired printing performance; and
   logic configured to facilitate adjustment of the printing device printing parameters to provide the desired printing performance by changing internal settings of the printing device, the internal settings including those affecting quality and speed of the printing performance of the printing device.

27. The software of claim 26, where in the logic configured to facilitate adjustment of the printing parameters comprises logic configured to facilitate transmission of specific desired printing parameters to the printing device.

28. The software of claim 26, further comprising a graphical user interface (GUI) configured to receive an identification of a printing performance setting.

29. The software of claim 28, wherein the graphical user interface (GUI) includes a performance spectrum with high printing quality at one end of the spectrum and high print speed at another end of the spectrum.

30. The software of claim 26, wherein the printing parameters pertain to at least one of font substitution, font bitmapping, resolution down-sampling, data compression, I/O buffer size, masering buffer size, and jam recovery.

* * * * *